United States Patent Office 2,970,179
Patented Jan. 31, 1961

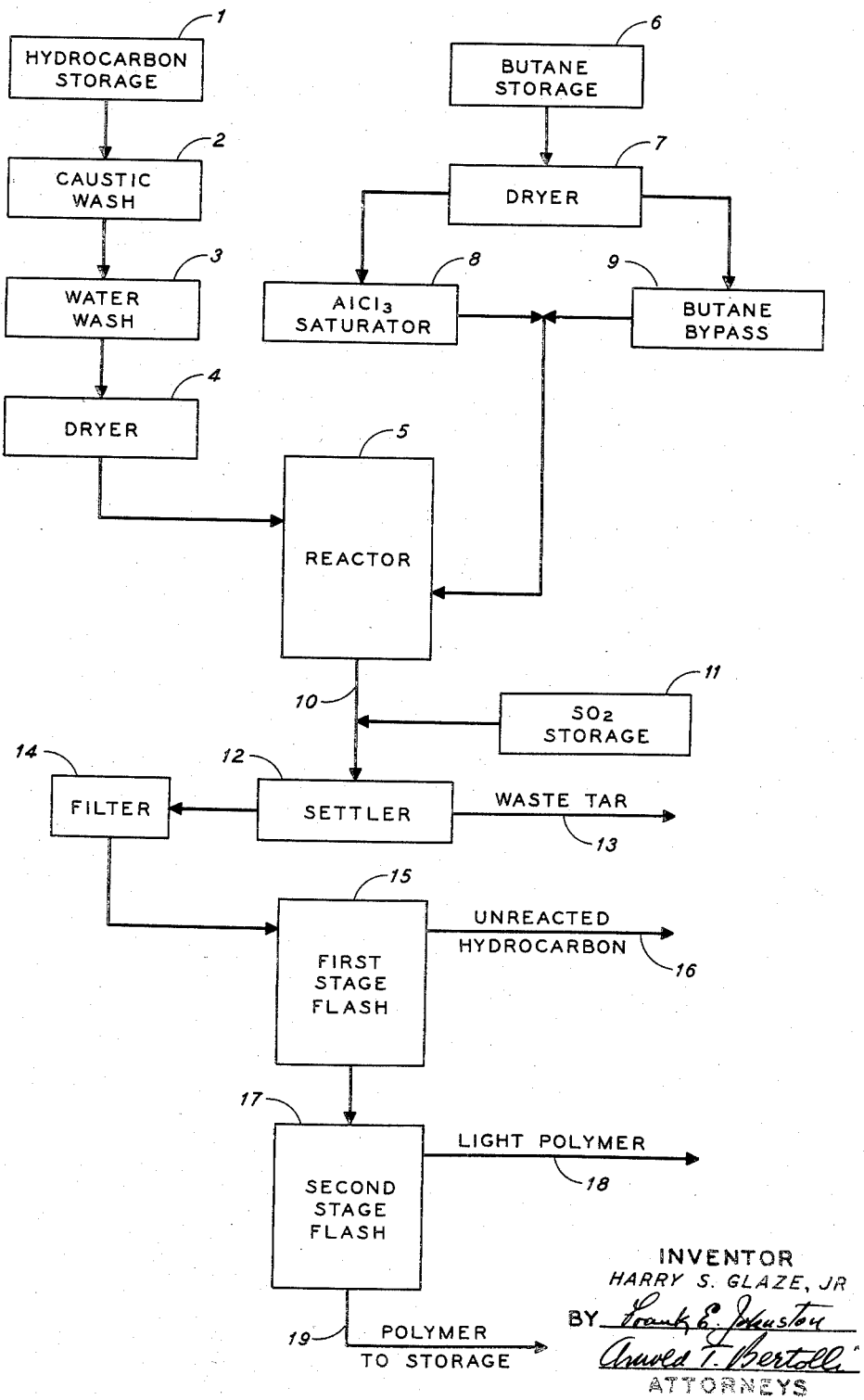

2,970,179
PRODUCTION OF BUTENE POLYMERS

Harry S. Glaze, Jr., San Rafael, Calif., assignor to California Research Corporation, San Francisco, Calif., a corporation of Delaware Filed June 29, 1959, Ser. No. 823,684

6 Claims. (Cl. 260—683.15)

This invention relates to the production of hydrocarbon polymers from butenes and more particularly to process improvements in the production of such polymers whereby the viscosity of the polybutene produced can be accurately controlled.

Hydrocarbon polymers derived from butenes are very valuable and have been produced commercially for some time. The polymers are produced in several viscosity grades and are used as lubricating compounds, adhesives, calking compounds, cable oils, capacitor insulation, etc., depending upon the viscosity of the particular grade.

These butene polymers are produced by contacting in a reaction zone a hydrocarbon stream containing butenes and butanes in liquid phase with an aluminum chloride catalyst at temperatures within the range of about —100 to 120° F. The viscosity of the polymers produced may be controlled by controlling the catalyst concentration and reaction temperature. Lower catalyst concentrations and lower temperatures give polymers of higher viscosity. The polymers produced are withdrawn from the reaction zone and separated from catalyst-containing tars and unreacted butenes and butanes.

In the practice of this process, difficulties have been encountered in controlling the viscosity of the polymers produced. The process often results in the production of a body of polymers having such a broad range of molecular weights that extensive processing is necessary to isolate any particular desired polymer fraction having a desired viscosity. Furthermore, in many instances it has been difficult to produce polymers of extremely high viscosity because the high molecular weight products which would give such extremely high viscosity are contaminated with difficultly separable lower molecular weight polymers which substantially reduce the viscosity of the mixture.

It has now been found that the viscosity of the polymer mass produced by this process can be accurately controlled by introducing a minor amount of sulfur dioxide into the polymer mass after it is withdrawn from the reaction zone and before the subsequent separation and purification steps of the process. When this practice is followed, the molecular weight and hence viscosity of the polymer can be controlled accurately by control of reaction temperature and catalyst concentration; and at any given set of operating conditions, the mass of polymers produced will have a narrow range of molecular weights. For this reason, the practice of the present invention permits the production of polymers of controlled viscosity without extensive separation of polymer fractions, and permits the production of polymers of extremely high viscosity uncontaminated by lower viscosity materials. The process is of particular utility for the production of polymers having a viscosity above about 1000 seconds Saybolt Universal at 210° F.

The invention will be understood in more detail from the following description read together with the attached drawing which is a schematic-flow diagram of apparatus by which the invention can be practiced.

In the attached drawing, the hydrocarbon storage vessel 1 may be conventional storage facilities or the effluent conduits from a suitable hydrocarbon production facility. The hydrocarbon stream leaving vessel 1 is preferably derived from the olefin-containing gases produced in the thermal or catalytic cracking of petroleum oils, distillates or residuum, although other olefin-containing materials may be used. The stream should contain, in the major part, hydrocarbons having four carbon atoms per molecule, and the stream may contain substantial quantities of butanes, 1- and 2-butenes, and isobutene. While isobutene is the most desirable olefin feed for the polymerization, it should be associated in the hydrocarbon stream with other butenes which enter the polymerization to a lesser extent and butanes which, in the most part, perform as a diluent in the process, adding fluidity to the reaction mass and dissipating the heat of the polymerization reaction.

The hydrocarbon stream is passed from storage vessel 1 through caustic wash 2 and water wash 3 to remove acidic- and water-soluble impurities therefrom. The stream is finally dried in dryer 4 and passed to the polymerization reactor 5.

Aside from hydrocarbon storage vessel 1, there is provided a butane storage vessel 6 from which butane is passed through dryer 7 to aluminum chloride saturator 8. The aluminum chloride saturator conveniently comprises an elongated tube or tubes filled with dry aluminum chloride and equipped with variable heating means. The saturator 8 is maintained at constant temperature, and butane is passed therethrough from dryer 7 at a sufficiently low rate so that it becomes substantially saturated with aluminum chloride. A small amount of butane from dryer 7 is passed through butane bypass 9 and introduced into the effluent stream from saturator 8 in order to avoid deposition of aluminum chloride in subsequent conduits. The butane stream containing aluminum chloride is then passed to reactor 5. Control of the temperature of saturator 8 and the butane flow rate therethrough controls the rate of aluminum chloride catalyst feed to reactor 5. The temperature and butane flow rate are controlled so that aluminum chloride is fed to the reactor in an amount of from 0.04 to 5.0 pounds of aluminum chloride per barrel of hydrocarbon feed and preferably in an amount of from 0.2 to 2.5 pounds of aluminum chloride per barrel of isobutene in the feed.

Reactor 5 is maintained under superatmospheric pressure sufficient to maintain the reactants in liquid phase; and, accordingly, conduits leading to the reactor are provided with the pumps necessary to deliver the various streams to the reactor at elevated pressures. The reactor is maintained at a temperature within the range of about —100 to 120° F. depending on the rate of aluminum chloride feed thereto and the desired viscosity of the polymer product. The residence time of the olefin in the reactor may be from about 5 to 60 minutes or higher.

The polymers produced in the reactor 5 are withdrawn from the bottom thereof through line 10, together with tars containing spent aluminum chloride catalyst. Sulfur dioxide is pumped from sulfur dioxide storage vessel 11 into line 10 at a point adjacent to reactor 5. The quantity of sulfur dioxide introduced into line 10 should be between 50 and 500, and preferably 100 to 250, parts per million parts by weight of polymer-containing stream in line 10.

The polymer-containing stream in line 10 is then passed to settler 12 where the bulk of the catalyst-containing tar is deposited on large aggregate and withdrawn through line 13. The polymer stream is then passed through fine clay filter 14 to remove the remainder of the tar.

The purified polymer stream is then passed to first stage flash 15 where unreacted hydrocarbons containing predominantly four carbon atoms per molecule are separated through line 16. First stage flash 15 is preferably maintained at 350 to 450° F. and about 3 to 6 atmospheres pressure. The material in line 16 may be recycled to vessel 1. The polymer-containing stream remaining in vessel 15 is passed to second stage flash 17 where light polymers, up to about twenty carbon atoms per molecule, are removed through line 18. Second stage flash 17 is preferably maintained at a temperature of from 350 to 450° F. and a pressure of 10 to 200 millimeters of mercury. The polymer remaining in second stage flash 17 is withdrawn through line 19.

When the process is practiced in accordance with the above description, polymers of uniform, high viscosity having a narrow range of molecular weights can be produced, and the viscosity of the polymer produced can be controlled accurately by controlling the hydrocarbon feed rate from vessel 1, the temperature of the reactor 5, and the temperature in and butane flow rate through saturator 8.

The process, having been described in detail, is further illustrated by the following examples in which the process was practiced as described above. In Example I, sulfur dioxide was introduced into the polymer stream in line 10 at a rate of 140 parts per million parts of stream passing through line 10. In Example II, no sulfur dioxide was used. In both examples, the hydrocarbon feed material in vessel 1 was a $C_4$ fraction obtained from the effluent of a catalytic cracker and contained approximately 39% butanes, 36% 1- and 2-butenes, 21% isobutene, 0.5% propane, 2% pentanes, and 0.5% pentene.

*Examples*

| Example No. | I | II |
|---|---|---|
| Period of time—hours | 24 | 24 |
| Hydrocarbon feed from storage 1—barrels | 1,300 | 1,116 |
| Butane to saturator 8—barrels | 160 | 130 |
| Butane to bypass 9—barrels | 70 | 60 |
| Average saturator temp.—°F | 173 | 174 |
| Pounds of AlCl₃ consumed | 178 | 158 |
| Pounds of AlCl₃ per barrel if feed | 0.137 | 0.141 |
| Reactor temp.—°F | 50 | 52 |
| Temp. of filter 14—°F | 84 | 90 |
| First flash: | | |
|   Temp., °F | 331 | 375 |
|   Pressure, p s.i.g | 80 | 59 |
|   Unreacted hydrocarbon (barrels) | 1,269 | 1,070 |
| Second flash 17: | | |
|   Temp., °F | 370 | 389 |
|   Pressure—mm. of Hg | 70 | 98 |
|   Barrels of light polymer | <1 | <1 |
| Heavy polymer yield—barrels | 165 | 167 |
| Heavy polymer viscosity—SSU at 210° F | 3,680 | 1,080 |

As illustrated in these examples of the production of polymers under comparable conditions with and without the use of sulfur dioxide, the use of sulfur dioxide in accordance with this invention produced a yield of polymers comparable in quantity with the yield obtained without sulfur dioxide, but the polymer mass obtained using sulfur dioxide had a viscosity 3.4 times as high as that obtained when sulfur dioxide was not used.

What is claimed is:

1. In a process for producing butene polymers of high viscosity by contacting in liquid phase a butene-containing hydrocarbon feed with aluminum chloride in a reaction zone, passing the effluent from the reaction zone comprising butene polymers, unreacted hydrocarbons, and aluminum-containing tars into a settling zone to separate a hydrocarbon phase and an aluminum chloride tar phase, and distilling the hydrocarbon phase to separate unreacted hydrocarbons overhead and butene polymers as a bottoms product, the method of producing a butene bottoms product having a narrow range of polymer molecular weights which comprises introducing a minor amount of sulfur dioxide into the effluent from the reaction zone prior to completion of the separation of the aluminum chloride tar phase from the effluent.

2. The process of claim 1 in which said sulfur dioxide is introduced into said product mixture in an amount of from 50 to 500 parts by weight per million parts by weight of said product mixture.

3. In the process for producing hydrocarbon polymers of high viscosity by contacting in liquid phase a hydrocarbon mixture consisting, in the major part, of normal and isobutenes and butanes with anhydrous aluminum chloride in a reaction zone at a temperature within the range of −100 to 120° F. to produce a reaction mixture containing said hydrocarbon polymers, unreacted butenes and butanes, and aluminum-containing tars, removing said product mixture from said reaction zone, and separating said tars and unreacted butenes and butanes from said product mixture, the improvement comprising producing hydrocarbon polymers having a narrow molecular weight range and having an average viscosity greater than 1000 seconds Saybolt Universal at 210° F. by introducing a minor amount of sulfur dioxide into said product mixture after it has been removed from said reaction zone, and prior to completion of the separation of said tars from said product mixture.

4. The process of claim 3 in which said sulfur dioxide is introduced into said product mixture in an amount of from 50 to 500 parts by weight per million parts by weight of said product mixture.

5. In a process for producing butene polymers having viscosities above about 1000 SSU at 210° F. by contacting in liquid phase a butene-containing hydrocarbon feed with aluminum chloride in a reaction zone, passing the effluent from the reaction zone comprising butene polymers and unreacted hydrocarbon into a settling zone to separate a hydrocarbon phase and an aluminum chloride tar phase and distilling the hydrocarbon phase to separate unreacted hydrocarbons overhead and butene polymers as a bottoms product, the method of increasing the viscosity of the butene polymer bottoms product which comprises introducing a minor amount of sulfur dioxide into the effluent from the reaction zone prior to completion of the separation of the aluminum chloride tar phase from the effluent.

6. The process of claim 5 in which said sulfur dioxide is introduced into said effluent from the reaction zone in an amount of from 50 to 500 parts by weight per million parts by weight of said effluent.

References Cited in the file of this patent

UNITED STATES PATENTS

| | | |
|---|---|---|
| 2,330,761 | Tongberg | Sept. 28, 1943 |
| 2,442,644 | Elwell et al. | June 1, 1948 |
| 2,559,984 | Montgomery et al. | July 10, 1951 |
| 2,698,320 | Garabrant et al. | Dec. 28, 1954 |